(12) United States Patent
Capy et al.

(10) Patent No.: US 8,991,460 B2
(45) Date of Patent: Mar. 31, 2015

(54) ASSEMBLY FOR PRODUCING PAPER PACKAGING FOR FAST FOOD, PARTICULARLY COMPRISING DEEP COATED PLEATS

(76) Inventors: Gilbert Capy, Jarnioux (FR); Akiva Buchberg, Ontario (CA)

( * ) Notice: Subject to any disclaimer, the term of this patent is extended or adjusted under 35 U.S.C. 154(b) by 446 days.

(21) Appl. No.: 13/500,688

(22) PCT Filed: Oct. 5, 2010

(86) PCT No.: PCT/FR2010/000659
§ 371 (c)(1),
(2), (4) Date: Apr. 6, 2012

(87) PCT Pub. No.: WO2011/042621
PCT Pub. Date: Apr. 14, 2011

(65) Prior Publication Data
US 2012/0193031 A1 Aug. 2, 2012

(30) Foreign Application Priority Data
Oct. 8, 2009 (FR) ...................................... 09 04826

(51) Int. Cl.
*B32B 37/04* (2006.01)
*B32B 38/18* (2006.01)
(Continued)

(52) U.S. Cl.
CPC ................. *B31B 45/00* (2013.01); *B29C 53/36* (2013.01); *B29C 65/10* (2013.01); *B29C 66/72328* (2013.01); *B29K 2711/123* (2013.01); *B31B 2201/2695* (2013.01); *B31B 2203/00* (2013.01)
USPC ........ 156/378; 156/443; 156/474; 229/87.03; 383/104; 383/120; 493/154

(58) Field of Classification Search
CPC B31B 45/00; B31B 2201/2691; B32B 37/04; B32B 38/18; B65C 5/04; B65C 9/2208; B65D 75/14; B65D 75/18; B65D 75/24
USPC ........ 156/378, 443, 474; 229/87.03; 383/104, 383/120; 493/154
See application file for complete search history.

(56) References Cited

U.S. PATENT DOCUMENTS

| 2,631,508 A | * 3/1953 | Muehling ..................... 493/289 |
| 4,795,648 A | 1/1989 | Capy et al. |

(Continued)

FOREIGN PATENT DOCUMENTS

| AU | B-18867/92 | 12/1992 |
| FR | 2 595 666 | 9/1987 |

(Continued)

OTHER PUBLICATIONS

Translation of FR 2676194 published Nov. 13, 1992.*

*Primary Examiner* — George Koch
(74) *Attorney, Agent, or Firm* — Greenblum & Bernstein, P.L.C.

(57) ABSTRACT

The present invention relates to the description of machine-assisted production assemblies and to the optimization thereof, said assemblies having, built therein, a patented device for folding into deep coated folds, thus making it possible to create paper packaging for fast food, said assemblies all comprising a folded element from a folded paper strip 31. Said machines are modular and all comprise, upstream, an assembly of modules 5, 6, and 7 that supply a folded paper strip 31 that is then converted in a specific finishing module 8 for making, from said lidded paper strip, a packaging for a sandwich or loose product such as fries or chicken pieces.

22 Claims, 11 Drawing Sheets

(51) Int. Cl.
*B31B 45/00* (2006.01)
*B29C 53/36* (2006.01)
*B29C 65/10* (2006.01)
*B29C 65/00* (2006.01)
*B29K 711/12* (2006.01)

(56) References Cited

U.S. PATENT DOCUMENTS

| | | | |
|---|---|---|---|
| 5,122,216 A * | 6/1992 | Goodwin, III | 156/303 |
| 5,188,265 A | 2/1993 | Capy | |
| RE35,241 E | 5/1996 | Capy et al. | |
| 5,743,460 A | 4/1998 | Capy et al. | |
| 6,082,898 A | 7/2000 | Capy et al. | |
| 6,244,321 B1 * | 6/2001 | Sakamoto | 156/504 |
| 2007/0029036 A1 * | 2/2007 | Fort et al. | 156/291 |

FOREIGN PATENT DOCUMENTS

| | | |
|---|---|---|
| FR | 2 628 719 | 9/1989 |
| FR | 2 661 404 | 10/1991 |
| FR | 2 663 621 | 12/1991 |
| FR | 2 676 037 | 11/1992 |
| FR | 2 676 194 | 11/1992 |
| FR | 2 689 105 | 10/1993 |
| FR | 2 692 867 | 12/1993 |
| FR | 94.01785 | 8/1995 |
| FR | 96.12328 | 4/1998 |

* cited by examiner

Method for sizing the Wrappie

Pleated paper

Paper reel width    Wpp = H+D

Determination of pleating pitch

- Length of pleated paper $$L = 1.2 * 3.14 * D$$

- Pitch  $S = (2*B) + A$ $A = 5mm \quad C = 18\,mm$ $B = (L - C - (14 * A)) / 30$

ASSEMBLY FOR PRODUCING PAPER PACKAGING FOR FAST FOOD, PARTICULARLY COMPRISING DEEP COATED PLEATS This application is a national stage entry of PCT/FR2010/000659 filed on Oct. 5, 2010.

The present invention relates to the description of machine-assisted production processes and to the optimization thereof, such processes incorporating the devices patented under French Publications Nos. 2661404 and 2663621, hereinafter referred to as a "pleating device for creating deep coated pleats", which make it possible to produce paper-based packaging comprising deep coated pleats in the following French patent applications or publications:

French Patent Publication No. 2595666 and the improvement thereof patented under French Patent Publication No. 2628719, hereinafter referred to as the "wrapper"; French Patent Publication No. 2676037, hereinafter referred to as the "wrappie" and its alternative pleated packaging for Mexican tortillas, hereinafter referred to as the "tacos"; French Patent Publication No. 2689105 and the improvement thereof patented under French Publication No. 2692867, which is a bag for packaging French fries, hereinafter referred to as the "magic-bag"; French Patent Application No. 94.01785 and the improvement thereof, hereinafter referred to as the "self-closable pleated packaging" for long sandwiches; and French Patent Application No. 96.12328, hereinafter referred to as the "self-closable pleated bag". All of these packaging containers, hereinafter referred to as "packaging for fast food", are paper based and designed to be self-closable so as to substantially reduce paper consumption by limiting the amount of paper wraps as much as possible, due to their extremely efficient pleating obtained from the pleating device for creating deep coated pleats; this relates to sandwiches using bread rolls or squares and enables paper-saving of up to 30% on the amount of paper normally used. These packaging containers add a unique comfort of consumption while minimizing waste and environmental impact.

The object of the invention is to identify the field of machinery, hereinafter called "machine", enabling the manufacture of packaging containers for sandwiches sold by fast food restaurants, which generally are round, square or elongated in shape, and for loose derivative products such as French fries or breaded chicken pieces contained entirely or partially in a pleated paper, hereinafter called the "pleated element", comprising deep pleats fixed at their ends.

Other characteristics will become more apparent from the following description, with reference to the annexed drawings provided by way of example only, and in which:

FIG. 1 shows a sheet, by way of example, for sizing a pleated element 1 having fifteen pleats, shown in a cross-section parallel to the direction of the pleats visible in the drawing prior to being coated and prior to their ends being fixed, based on the size of a sandwich 2, shown in elevation, making it possible to define the width Wpp of the paper reel and the main characteristics of the pleats. The sheet contains simple formulas for selecting the most appropriate standard tools.

Throughout the following description, numbered elements are used, which correspond to optimized dimensions of currently available packaging containers for fast food products, but the same products can also be packaged in containers similar to those described hereinafter, corresponding to various numbers of pleats of various depths, optimized and sized differently while remaining within the scope of the invention. The use of numbered elements simplifies the explanations that follow.

Figure 1:
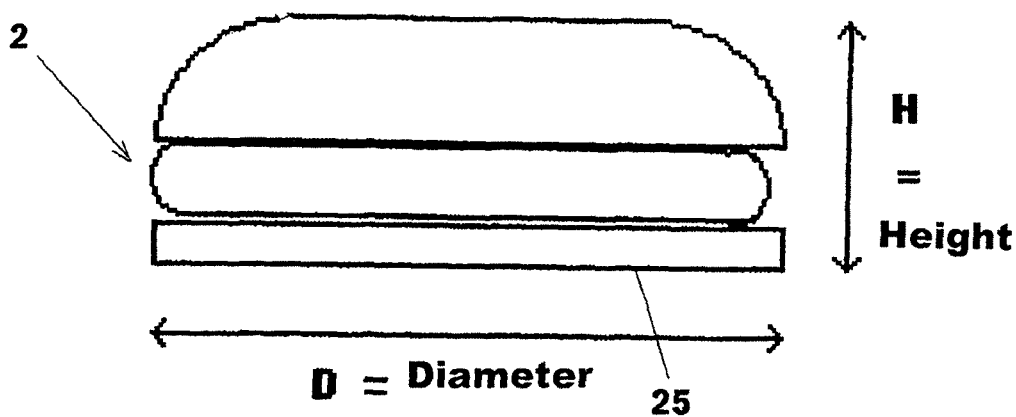
Figure 1:
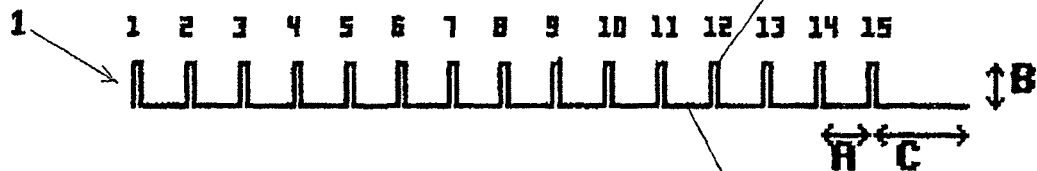
Figure 7:
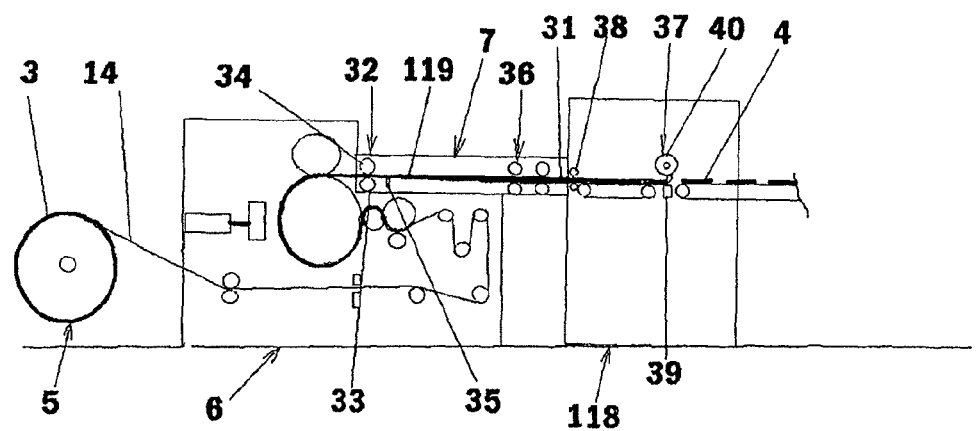
FIG. 7 is a schematic elevation view of the machine for making the "Wrapper", without the grouping device of FIGS. 3 and 4.

The paper used for making the packaging containers is preferably comprised of Kraft paper having a weight per square meter preferably between 20 and 30 grams per square meter, and which is coated on only one side with a low pressure polypropylene and/or polyethylene film of 5 to 10 grams per square meter, that is to say a weight per square meter of the coated paper, hereinafter referred to as the "paper", ranging from 25 to 40 grams per square meter. The optimum operating range of the machines at high speed is 29 grams, more or less 2 grams per square meter, which corresponds to standardized manufacturing with large production capacity, as the speed drops significantly beyond this weight and produces pleats that are more difficult to deploy, and the price of paper becomes prohibitively expensive below this weight, because this corresponds to the manufacture of specific products. Each of the fast food packaging containers uses a "pleated element" in which the ends of the pleats are fixed, which has features that are specific to this packaging container and is called the "free pleated element" 1 when it is part of a strip whose pleats have not yet been fixed, each pleat being particularly characterized by its "deployed pitch" $S=((2*B)+A)$ (FIG. 1), when it is deployed, and its "pleated pitch" (A), the pleats overlapping one another gradually over a length equal to (B). The ratio of the deployed pitch to the pleated pitch, referred to as the "pleating ratio", defines the depth of the pleat, the pleating ratio (S/A) is between four and six for sandwiches using round or square bread, the pleating ratio being on the order of two to three for long sandwiches, the magic-bags or the self-closable bags. The pleated device is formed of a rectangular sheet whose width corresponds to the width of the pleats, taken prior to fixing the pleats, in the direction perpendicular to the direction of the pleating; and the length of the sheet corresponds to the total length of the deployed pleats, increased by a "pleatless zone" C for separating the successive pleated elements 1. The rectangular sheet is obtained from a paper strip 14, delivered by a paper reel 3 (FIG. 2), having a width Wpp equal to the width of the rectangular sheet, and which can be cut after the pleating and welding of the end of the pleats without waste to form a pleating element 4 (FIG. 7). The pitch of the coated pleats is adjusted as a function of the size of the fast food packaging container to be manufactured; it is an essential element in the desired quality of service. The deployed pitch of the coated pleats, when unfolded, is preferably chosen between 20 mm and 30 mm depending upon the size of the fast food packaging container to be manufactured, and, when folded, their pitch is chosen from 5 mm to 10 mm for a given range of products, regardless of the size of the packaging container to be manufactured. This feature makes it possible to use multipurpose production machines for a predetermined type of packaging to be manufactured, by means of minor adjustments to the pleating device for creating deep coated pleats. The paper can be printed on the side which is not coated with the polypropylene and/or polyethylene film, but it is preferable not to have any ink over a width of 15 mm at the end of the pleats prior to their being fixed, in order to provide reliable heat-sealing or ultrasonic welding of the end of the deep pleats.

The paper strip 14 is in the form of a reel 3 (FIG. 2), having a diameter preferably ranging from 600 mm to 1200 mm, corresponding to standardized pallet dimensions, with the polypropylene and/or polyethylene film being located on the inner surface so that, when the reel 3 pivotally unwinds about a horizontal axis, with the paper strip 14 separating from the top of the reel 3, the polypropylene and/or polyethylene film is located underneath. The pleat production rate can then reach two hundred pleats per second, at intrinsic speed, which is to be compared to the alternative pleating machines, the only ones commercially available, which do not exceed five pleats per second. However, this rate is often slowed by the packaging container finishing devices and the problems associated with static electricity being present on the paper surface. This rate is reached by means of several adjustments that are specified hereinafter. It is preferable to maintain the reels 3 in a dry atmosphere for the coating of polypropylene and/or polyethylene dries the paper which, thereafter, can get wet only via the edge, introducing a difference in relative humidity in the transverse direction, which causes, at the time of unwinding the reel 3, a partial winding of the edges of the paper strip 14, making its in-line positioning more difficult.

The machines of the invention are modular machines, comprising a first set of modules, of similar design, said set of modules being common to all machines covered by the instant patent. This common set of modules includes a paper feed module 5 (FIG. 2) located at the machine head, a pleating module 6 for creating deep pleats, a module 7 for fixing the ends of the pleats, which is generally located above the pleating module for creating deep pleats. The machine further comprises a second set of modules comprised of a finishing module 8 specific to each type of product manufactured, located in the extension of the module 7 for fixing the pleats, a module 9 (FIGS. 3 and 4) for grouping and processing the finished packaging containers, which is located in the extension of the aforementioned module 8 (FIG. 2), and the principle of which is common to all machines covered by the instant patent. All of these elements are synchronized with one another, either mechanically with variable speed central motorization, or electronically using motors with variable frequency, or yet using a combination of both systems. These modules include control and regulating devices that are commercially available in standardized form and are used without modification. The module 5 (FIG. 2) for feeding the paper strip 14 comprises at least one paper reel winder, preferably two aligned reel paper winders so as to have a first reel 3 under constant unwinding and a second reel (not shown) on stand-by, and set-up concurrently. The mandrel 11 of these winders preferably has a diameter of three inches, that is to say 76.2 mm, which is a standard diameter. The mandrels 11 used are not motorized but are slowed in their rotation so that the paper is always tensioned, and they include a rotation blocking brake, in the event of an ill-timed stoppage of the machine. Each winder includes a sensor (not shown) setting off an alarm when the reel reaches the end of its travel, so that the operator is notified of the need to replace the reel. The sensor triggers the stoppage of the machine if the operator does not intervene within a preset period of time to prevent the machine from running out of paper strip 14 and to avoid having to reset the paper strip 14 throughout the machine, which requires up to several tens of minutes and produces paper waste. The operator's work is to butt join the paper strip 14 of the first empty reel 3 and that of the second full reel (not shown) using an adhesive tape, and then to restart the machine slowly to allow time for the area of the paper containing the butt-joint to pass through all of the modules of the machine, and for the corresponding packaging containers produced to be eliminated. A shunt device is generally installed at the outlet of the finishing module to divert the flow of manufactured products towards a device for collecting products of uncertain quality, following a restart of the machine due to a reel replacement or to an incident occurred upstream. This shunt device (not shown in the drawings) is set up automatically at each stoppage, whether the stoppage is ill-timed or not, and the machine operator disables it manually once he determines that production meets the required quality standards. The shunt device generally consists of pivoting the end of the output conveyor belt about its upstream end, in an axis parallel to the plane of the manufactured packaging, with the aid of a jack articulated on the output conveyor belt and on a fixed point on the chassis of the finishing module, and which causes the output conveyor belt to open out above a chute for removing questionable products, in the area of which the operator can retrieve a sample that has just been manufactured to check its quality.

The pleating module 6 (FIG. 2) has, at the inlet of the paper strip 14 into the module, a pulling device 12 comprised of two variable speed motorized cylindrical rollers that pinch the paper strip 14 coming from the reel 3 as it is unwinding. A centering device 13 is located behind the pulling device 12, which controls the lateral displacements of the paper strip 14 due to irregularities in thickness of the paper and of the coating as a result of depositing polypropylene and/or polyethylene on the paper at an elevated temperature which locally deforms the paper strip 14. It should be noted that it is this phenomenon that led to abandoning the envisioned large-width pleating by an alternate device to compensate for the low pleating speeds of this manufacturing method. The centering device 13, for example, is comprised of photoelectric cells 16, positioned in the vicinity of the edges of the paper strip 14, coupled to a device having an oscillating axis 15 for supporting the paper strip, and which carries out the centering corrections. The centering device is followed by a device for adjusting the tension of the paper strip, hereinafter referred to as the "tension control device" 17. This tension control device 17 makes it possible to refine a constant deployed pleat length S (FIG. 1), whereas the pleated pitch (A) does not vary as a function of the variations in tension of the paper strip 14. The deployed pleat length S may lose several millimeters due, for example, to an increase in the tension of the paper strip 14 (FIG. 2), which, in view of the number of pleats, can result in producing a pleated element that is too small, undetectable to the naked eye, and which constitutes a critical defect requiring the produced element to be discarded, as the overly small pleated element is torn when being deployed around a sandwich. The tension control device 17 is comprised, for example, of a loop of paper strip 14, facing downward, at the bottom of which a "tensioning cylinder" 18 for the paper strip 14 slides freely between two guides (not shown) having high and low position sensors (not shown) capable of influencing the speed of the paper delivered by the pulling device 12. When the tensioning cylinder 18 is in the high position, it activates the corresponding sensor, and the rollers of the pulling device 12 are accelerated; and when the tensioning cylinder 18 is in the low position, it activates the corresponding sensor and the rollers of the pulling device 12 are slowed down. The paper strip 14 can then enter into the wheels 19 of the pleating device 6. The pleating device is comprised of a toothed wheel 20 for preforming the pleats, which is associated with a preforming counter wheel 21, followed by a bar wheel 22, followed by a pleat grouping cylinder 23, followed by a pleat coating cylinder 24. When the paper strip 14 enters into the pleating device 6, the surface coated with polypropylene and/or polyethylene is applied onto the preforming wheel 20 by means of the preforming counter wheel 21 which pushes the paper strip 14 to the base of the teeth of the preforming wheel 20, whereas it is the paper side of the paper strip 14 which is then applied onto the bars of the bar wheel 22. Finally, it is the side coated with polypropylene and/or polyethylene which is applied onto the pleat grouping cylinder 23. One can observe that the paper strip 14 slides longitudinally on the bars of the bar wheel 22, which results, for example, in making a pleat with a shorter deployed pitch, followed by a pleat with a longer deployed pitch. A nonsubstantial sliding will not be detrimental to the proper functioning of the free pleated element (FIG. 1), insofar as the length "L" of the rectangular sheet forming the free pleated element 1 remains within the manufacturing tolerance. Variations in the pitch of the pleated element then occur, visible to the eye, without modifying the aspect of the pleated element when deployed.

Figure 2:
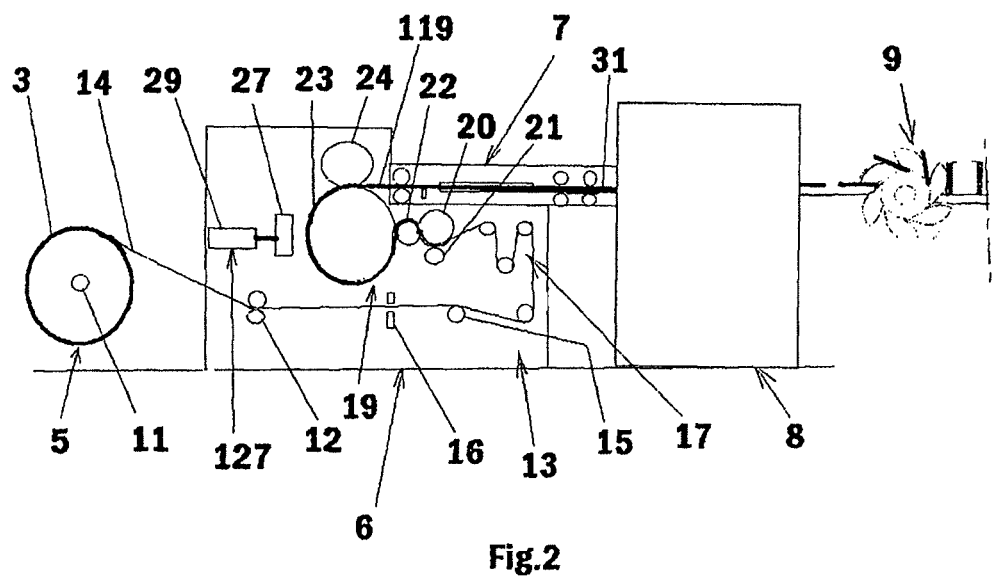
FIG. 2 is a schematic elevation view of a machine for making a simple pleated element shown in the form of a pleated paper strip.

The sizing of the pleating device 6 (FIG. 2) and that of the preforming wheel 20 and bar wheel 22 is theoretically specific to each packaging; it starts with the sizing of the pleats of the free pleated element 1 (FIG. 1) as a function of the product to be packaged. If it is a sandwich made using bread of round, square or intermediate shape, one begins by measuring the perimeter of the sandwich 2, while resting on its base, and then calculates an equivalent diameter "D" by dividing the measured perimeter by 3.14. One then measures the height "H" of the sandwich at its highest point relative to its base; the width "Wpp" of the paper reel 3 (FIG. 1), which corresponds to the width of the pleats of the pleated element prior to fixing the pleats, is equal to H+D, that is to say Wpp=H+D. Depending upon the variety of sandwiches to be packaged, the width Wpp ranges from 140 mm to 225 mm, which defines a maximum width of 230 mm for the wheels of the pleating device 6 (FIG. 2), which is capable of pleating any reel width between 140 mm and 225 mm, simply by adjusting the suction of the preforming wheel 20, bar wheel 22, and pleat grouping wheel 23 to compensate for the lateral suction losses. The number of pleats is determined for a machine by the number of bars, in the bar wheel 22, that it includes. A standard thickness of 5 mm, corresponding to the value "A" of the pleated pitch (FIG. 1) of the free pleated element 1, for the bars used to form the pleats, and a thickness "C"=23 mm for the bar used to make the pleatless zone have been determined experimentally. Above 12 pleats per packaging, the bar wheel 22 (FIG. 2) preferably makes one pleated packaging container per wheel revolution; for eight to twelve pleats, it is preferable to make two packaging containers per revolution due to problems related to the sizing of the bar wheel 22. Standards have been determined for the number of bars to cover the range of sandwiches for each type of packaging container: the standard is twenty pleats for the wrapper; fifteen pleats for the wrappie; and, finally, ten pleats for an economical line of sandwiches referred to as the "kid". The depth of the pleats is characterized by the value of "B" (FIG. 1); the length "L" of the rectangular sheet is determined by the perimeter of the sandwich, which is equal to (3.14*D) increased by the overlap rate of the ends of the pleated element; for example, if one chooses an overlap rate of twenty percent, the length of the perimeter is multiplied by a factor of 1.2, which yields a sheet length of L=(1.2*3.14*D), the length of the deployed pleat then being obtained by subtracting, from the length L of the sheet, the width "C" of the bar of the pleatless zone less the value of "A", and by dividing by the number of pleats imposed by the preforming wheel 20 (FIG. 2) and the bar wheel 22. This calculation can be made using a chart. The length S of the deployed pleat is determined by the height of the teeth of the preforming wheel 20 (FIG. 2). It is necessary to have interchangeable preforming wheels 20 or preforming wheel elements specific to the number of pleats of the bar wheel 22 and to the depth B (FIG. 1) of the pleats. Preforming wheels 20 (FIG. 2) have been experimentally determined, which make it possible to obtain pleated elements for each number of pleats of the bar wheel 22, the lengths S (FIG. 1) of the standard deployed pleats of which are 22.35 mm, 24 mm, 25.65 mm, 27.13 mm, 30 mm. It is thus possible, using a predetermined pleating module 6, to cover an entire range of sandwich packaging containers; however, regardless of the depth B of the pleats, the length of the pleated element remains 93 mm for a pleated element having fifteen pleats and 68 mm for a pleated element having ten pleats.

Figure 5:
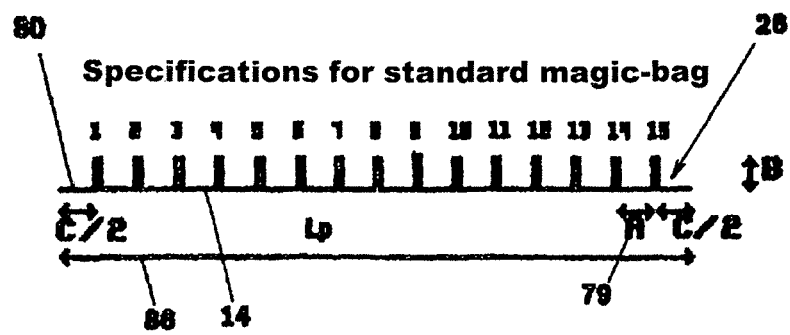
FIG. 5 shows a specification sheet for a "standard magic-bag" for French fries.
Figure 5:
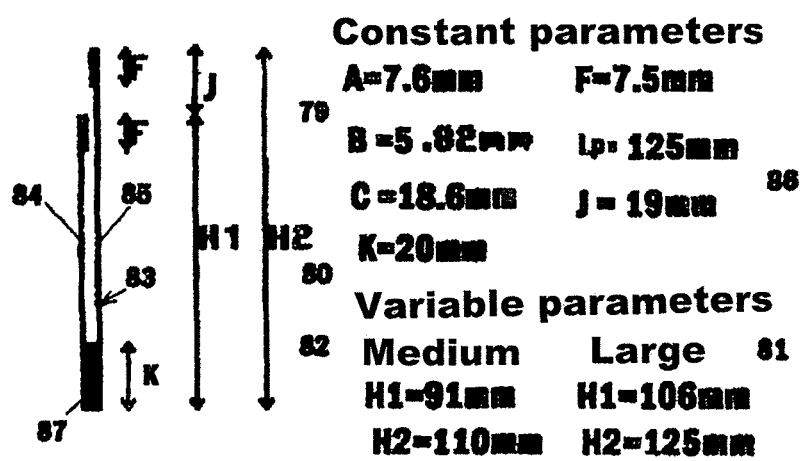
Figure 6:
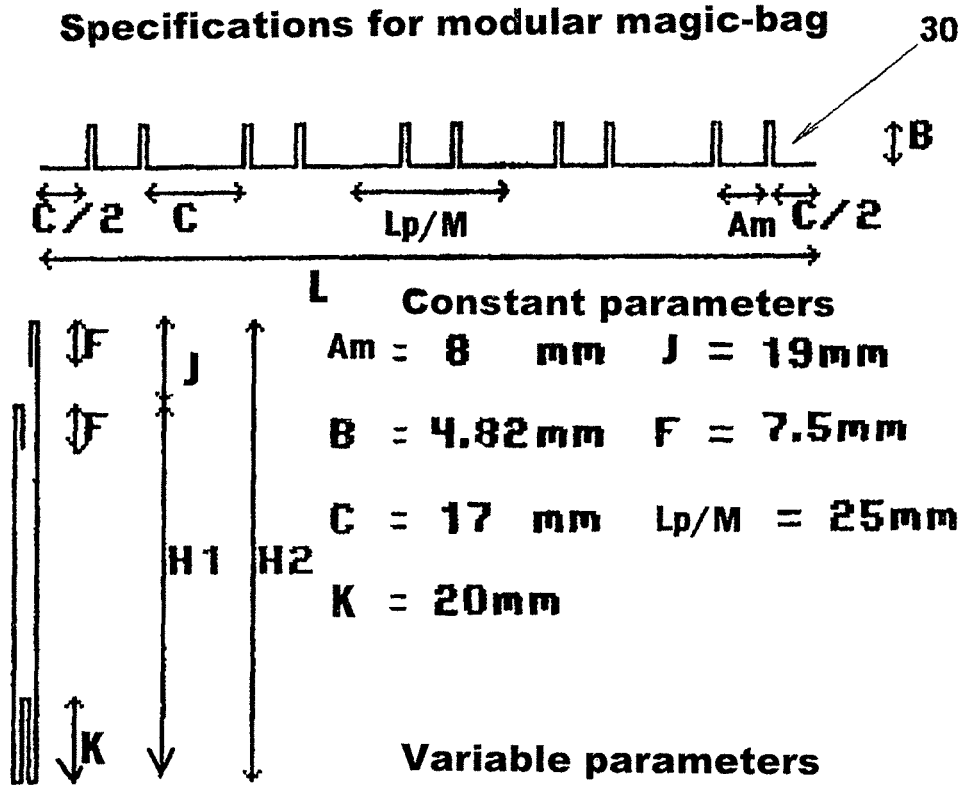
FIG. 6 shows a specification sheet for a "modular magic-bag" for French fries.

With respect to the packaging containers for loose products, such as the magic-bag, the pleats used are generally less deep, the pleating ratio being between 2 and 3; however, the pleated elements 26 (FIG. 5) use much wider pleats requiring widths Wpp of up to 300 mm. It is necessary to use thicker bars, of the bar wheel 22 (FIG. 1), for rigidity purposes, and the thickness is increased to 7.6 mm instead of 5 mm, whereas the bar of the pleatless zone is reduced to 18 mm. There are two standardized widths Wpp, determined experimentally, as a function of the capacity of the commercially available bags, that is to say 256 mm for the medium size bag, and 286 mm for the large size bag. In a first version, the number of bars is fifteen for making a packaging container of 15 pleats and the length "Lp" of the pleated element 26 is 125 mm. The bar wheel 22 (FIG. 2) makes one packaging container per revolution and the preforming wheel is sized accordingly. In a second version, the bar wheel is modular, that is to say that one alternates a bar having a width Am of 8 mm (FIG. 6) with a bar of 18 mm, which constitutes modules of 25 mm having a pleated pitch comprising two pleats, each having a pleating ratio greater than 3. The bar wheel comprises four to six sets alternating a bar of 17 mm and a bar of 8 mm to yield a set of pleats alternating two pleats with a pleatless space to form pleated elements having a pitch of 25 mm, making it possible to obtain magic-bags of various widths, hereinafter called the "modular magic-bag". Depending upon the desired capacity, the magic-bag can be comprised, for example, of three, four or five modules having a pleated pitch of 25 mm, each comprising two pleats. FIG. 6 gives an example showing the sizing of modular magic-bags as a function of a possible range of capacities.

It is important to maintain the shape of the pleats of the pleated element as long as their ends are not fixed. Since the cylinder 23 for grouping the pleats (FIG. 2) is in a vacuum, each pleat is held via suction in the zone corresponding to the support zones having a width "A" and "C" (FIG. 1) of the paper strip 14 (FIG. 2) on the bars, the remainder of the pleat forming a loop 28 having a length equal to (2*B) (FIG. 1), whose walls coated with polyethylene and/or polypropylene are supported on one another in a position perpendicular to the surface of the grouping cylinder 23 (FIG. 2). The pleat grouping cylinder 23 is capable of receiving, without modifications, all sizes of the free pleated elements 1 (FIG. 1) via appropriate adjustment, particularly with respect to spacing, of a pleat prefixing device 127 described hereinafter. Two hot air nozzles 27 (FIG. 2) are arranged in the vicinity of the edges of the paper strip 14 held by suction on the grouping cylinder 23, which heat the loops 28 (FIG. 1) over a width, of the paper strip 14, of about 15 mm, and which prefix the end of the pleats by bonding the coatings that are facing one another and are pressed against one another by the atmospheric pressure. These hot air nozzles 27 are temperature-regulated as a function of the speed of the machine, and they are mounted on jacks 29 which retract instantly when the machine stops to prevent ignition of the paper strip 14 when the speed is high.

In the case of wrappers and wrappies, a paper strip comes out of the pleat coating cylinder 24, such paper strip comprising prefixed pleats, hereinafter referred to as the "free pleated paper strip" 119, comprised of a series of free pleated elements 1 (FIG. 2), the deep pleats of which have a pleating ratio ranging from 4 to 6 and are partially superimposed to form successive zones having three layers of paper alternating with zones having five layers of paper and, between each free pleated element 1 (FIG. 1), a zone with only one layer of paper, formed by a bar width a width "C" of the bar wheel 22 (FIG. 2) and making it possible to separate the free pleated elements without generating waste. Exiting from the coating cylinders are pleated elements 26 (FIG. 5) having fifteen pleats, whose pleating ratio is between 2 and 3, in the case of the magic-bag, or a series of free pleated elements 30 (FIG. 6) having two pleats, whose pleating ratio is between 4 and 6, in the case of the modular magic-bag.

The paper strip 14 formed of successive free pleated elements 1 (FIG. 1), called the "free pleated paper strip" 119 (FIG. 2) then enters into the pleat fixing module 7, which is preferably positioned above the pleating module 6. The pleat fixing module 7 is mainly made of a chassis comprising two preferably horizontal conveyor belts (not shown) which pinch the free pleated paper strip 119 on top and bottom. The free pleated paper strip 119 has its surface coated with polypropylene and polyethylene facing down. The width of the conveyor belts leaves free the end of the pleats of the pleated paper strip 119, which overlaps on each side by at least 15 mm. A creasing device 32 is positioned near the inlet of the pleat fixing module 7 in order to demarcate a fold line, under the free pleated paper strip 119, located on each side at a distance of 7.5 mm from the edge of the free pleated paper strip 119. Each creasing device 32 is comprised of at least two coaxial rollers with narrow edges 33 positioned beneath the pleated paper strip, pinching the latter against the same number of wide coaxial rollers 34 positioned above, said rollers being motor-driven at a speed synchronized with that of the free pleated paper strip 119. The free pleated paper strip 119 comprising the lateral creases then passes through a zone equipped with hot air nozzles 35 which plasticize the polypropylene and/or polyethylene coating over a width of less than 15 mm; the edges then enter into a shaping device (not shown) which folds the edges of the free pleated paper strip 119 over a width of 7.5 mm by placing the coated surface of the free pleated paper strip 119 in contact with itself. Next, the folded edges of the free pleated paper strip 119 passes between wide knurling rollers 36, which are motorized and synchronized with the displacement speed of the free pleated paper strip 119, and which crush the edge the free pleated paper strip 119 over a width of 7.5 mm to permanently fix the end of the pleats and to form what is referred to hereinafter as a "pleated paper strip" 31. The width Wpp (FIG. 1) of the paper strip 14 (FIG. 7) used for making the various sandwiches is in the range of 140 mm to 225 mm, the conveyor belts used have a width which leaves the edges of the pleated paper strip 119 free over a width between 15 mm and 32 mm. Three pleat fixing modules 7 have been determined to be interchangeable as a function of the width of the paper strip 14 used, including, for example, a first pleat fixing module for the paper widths Wpp between 140 mm and 167 mm, a second pleat fixing module for the widths Wpp ranging from 170 mm to 188 mm, and a third pleat fixing module for the widths Wpp ranging from 190 mm to 225 mm. Each pleat fixing module 7 comprises a specific set of conveyor belts and is equipped with creasing 32, heating 35, and shaping and knurling 36 devices, the spacing of which is adjustable as a function of the width Wpp used within the width range of paper strip 14 allowed for this module. With respect to packaging containers for loose products, which use a wider pleated paper strip, two pleat fixing modules 7 have been defined, one of which covers the width of the paper strip 14 ranging from 240 mm to 286 mm and from 286 mm to 300 mm. When the speed permits, it is possible to suppress the heating nozzles and to position, at the outlet of the shaping devices, an ultrasonic welding device which disadvantageously stops working once the sonotrodes are too hot due to overly high speed.

The pleated paper strip 31 then enters into the finishing module 8 (FIG. 2), which is specific to the pleated packaging containers claimed in the aforementioned patents.

The "wrapper" is comprised of a simple pleated element 4 having twenty pleats; the finishing module 118 (FIG. 7) for the wrapper is comprised of a device 37 for separating the pleated elements 4. It is comprised of a device for feeding the pleated paper strip 31 coming from the knurling rollers 36; it can be a sliding plate or a conveyor belt. A device 38 for feeding the pleated paper strip 31 brings the latter on a smooth plate, referred to as the "fixed anvil" 39; it comprises a rotatable blade 40 in its upper portion, the cutting line of which is parallel to the plane of the fixed anvil 39, and the tangential speed of which is greater than the scrolling speed of the pleated paper strip 31. The rotatable blade 40 is adjusted so that, at right angles with the fixed anvil 39, the blade is flush with the fixed anvil 39, but without touching it; the pleated element 4 is then separated from the pleated element 4 (FIG. 1), which follows it at right angles with the pleatless zone to form a wrapper (FIG. 2). The average speed of rotation of the rotatable blade 40 is synchronized with that of the pleating device 6, so that its tangential speed is less than the scrolling speed of the pleated paper strip 31 along the major portion of the cycle of revolution of the blade, but its tangential speed is greater than that of the pleated strip 31 at the time of cutting, thereby yielding an impulse that increases the speed of the wrapper obtained after cutting the pleated paper strip 31, which facilitates its grouping. The length of the wrapper can vary by a few millimeters for the same number of pleats, as a function the conditions of adjustment, especially of the depression, in the bar wheel 22. The position of the pleatless zone moves upstream or downstream depending on whether the pleated element 4 shortens or lengthens. The device 37 for separating the pleated elements 4 is capable of being moved by horizontal translation in order to be correctly positioned at right angles with the pleatless zone during cutting. It should be noted that the width "C" of the pleatless zone is partially covered by the loop 28 of the last pleat of the preceding pleated element 4 having a height B. The remaining width of the pleatless zone for the cutting is actually equal to (C–B); the deeper the pleat, the narrower cutting zone.

Given that the length of the free pleated element 1 (FIG. 1), when the pleats are deployed, varies depending upon the adjustments, it is preferable to print continuously on the paper without reference marking.

The wrappie is comprised of a pleated element 4 having fifteen pleats, the theoretical length of which is 93 mm, which is lined over its entire surface with a sheet of paper laminated with a layer of polypropylene and/or polyethylene, and which is preferably identical to the "paper" defined previously, and hereinafter referred to as the "flat paper strip" 41 (FIG. 8), and which is welded via one of its edges in the area of the pleatless zone with width C of the pleated element 1, over a length of 75 mm. The flat paper strip 41 has a width Wf generally greater than the width Wpp of the paper strip 14 to be pleated and is generally wider by 35 mm in theory; however, depending upon the rounded shape of the sandwich, it can experimentally be reduced to 20 mm. The "wrappie" finishing module 42 comprises a sub-module 43 for unwinding the flat paper strip 41, positioned under the pleated paper strip 31 entering into the "wrappie" finishing module 42 and similar to that which feeds the machine with the paper strip 14 to be pleated and having the same properties. The flat paper reels which it receives are smaller because the amount of flat paper delivered is in the same ratio as the pleating ratio, that is to say 4 to 6 times smaller; the maximum diameter of the reels used is 760 mm. The flat paper strip 41 has its coated surface facing down; it moves in the opposite direction from that of the pleated paper strip 14 and enters into the sub-module 45 for welding the flat paper strip 41 transversely on the pleated paper strip 31. The unwinding sub-module 43 is comprised of a pulling device 46, identical to that previously described, equipped with a tension control device 47 such as that previously described. The flat paper strip 41 is then turned over by a set of guide rollers 134 in order to have its coated surface facing up, to be applied onto the lower surface of the pleated paper strip 31, and to enter, along with the pleated paper strip 31, into a driving device (not shown) identical to that previously described in the wrapper finishing module 118 and simultaneously driving the flat paper strip 41 and the pleated paper strip 31, applied against one another, at the same speed. At the outlet of the driving device, both the flat paper strip 41 and the pleated paper strip 31 enter into the transverse welding sub-module 45, which comprises, in its lower portion, a counter electrode 48 comprised of a cylinder with generatrices parallel to the pleats of the pleated paper strip 31, whose upper portion is tangential to the flat paper strip 41 and whose peripheral rotation speed is equal to that of the assembly comprised of the pleated paper strip 31 and the flat paper strip 41. A rotatable electrode 50, electrically heated and fixed to a rotatable cylindrical support 49 with generatrices parallel to the generatrices of the counter electrode 48, is positioned above the flat 41 and pleated 31 paper strips, and, at each revolution, at a peripheral speed equal to that of the flat 41 and pleated 31 paper strips, it presses the paper onto the counter electrode 48, at right angles with the pleatless zone of the pleated paper strip 31 in order to make a transverse weld of 75 mm. The assembly then enters into a sub-module 51 for separating the pleated elements associated by welding with a flat sheet of paper 52 of same length forming the wrappie, the separation sub-module 51 being identical to that described for the wrapper. Each of the transverse weld 45 and separation 51 sub-modules comprises a translational adjustment device, as previously described for the wrapper, enabling the positioning of the weld relative to the variations in length of the pleated element, on the one hand, and a positioning of the cut relative to the weld, on the other hand. Indeed, if the cut is made in the transverse weld, the wrappie thus manufactured can no longer be opened, as it is welded on its two edges and the defect is critical, on the one hand; and if the cut is made behind the weld, the two elements of the front surface of the wrappie, which are not affixed to one another, may be separated by the wind generated by the displacement speed, when grouping the wrappies for processing, and may be turned over during the grouping phase, on the other hand, as will be explained hereinafter.

Figure 8:
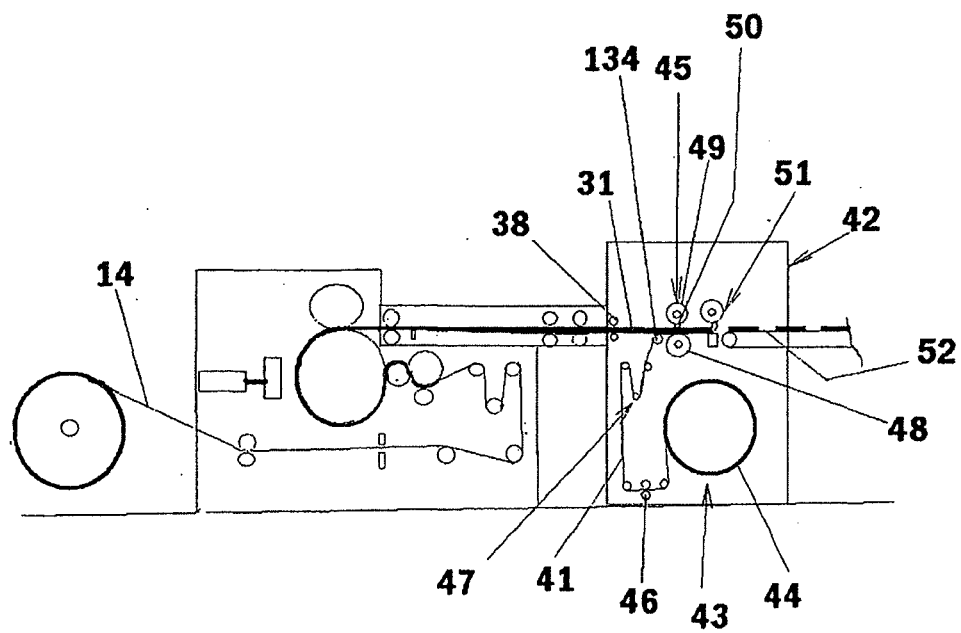
FIG. 8 is a schematic elevation view of the machine for making the "wrappie", without the grouping device of FIGS. 3 and 4.
Figure 9:
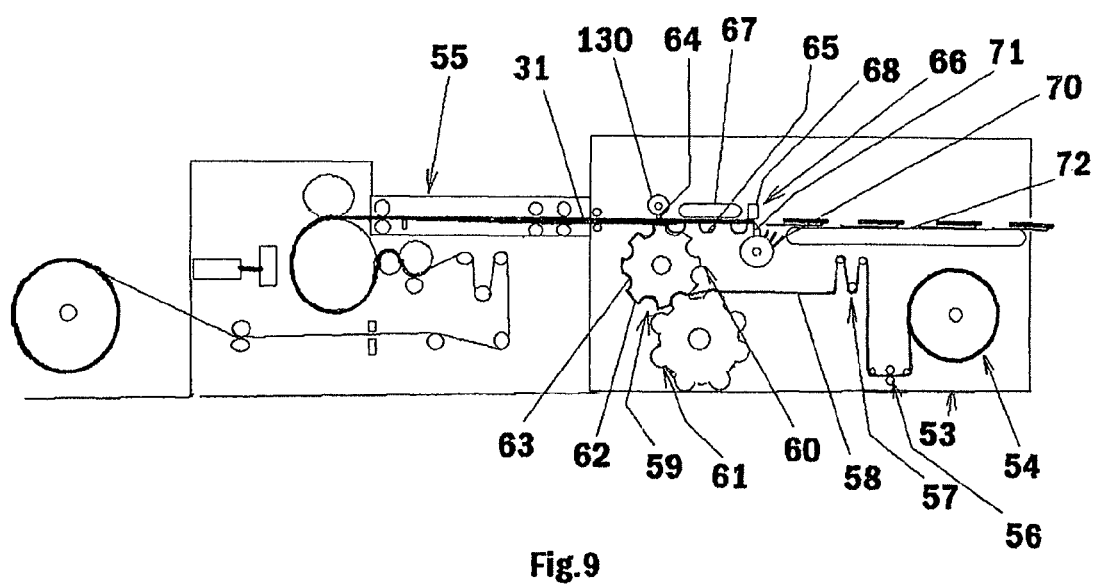
FIG. 9 is a schematic elevation view of the machine for making the "tacos", without the grouping device of FIGS. 3 and 4.

The "tacos" is intended for the packaging of circular Mexican tortillas, which are folded in half to form a space filled with loosely arranged food fillings. It is comprised of a pleated element having fifteen pleats lined with a rectangular flat paper, coated on one side with polypropylene and/or polyethylene, whose length is greater than the length of the pleated element, which is 93 mm, and substantially equal to the diameter of the circular tortilla having a diameter of about 120 mm to 150 mm, the width of the flat paper strip 58 (FIG. 9) being at the most equal to the width of the pleated paper strip. However, in the following description, only the case of a width of the flat paper strip 58, which is less than that of the pleated paper strip 31, will be considered, the other case being a textbook case or the inevitable consequence of using a packaging method for a different product. An edge of the flat paper strip 58 is fixed over all or part of its width on the pleatless zone and parallel to the pleats of the pleated element. The finishing module 53 (FIG. 9) of the machine 55 for manufacturing the "tacos" comprises a sub-module 54 for unwinding the flat paper, which is the same as the sub-module 43 for unwinding the flat paper (FIG. 8) of the wrappie finishing module 42, as well as the pulling device 56 (FIG. 9) and the device 57 for adjusting the tension of the flat paper. However, the fixing of the paper on the flat paper and the cutting are carried out in several stages. The pleated paper strip 31 enters into the tacos finishing module 53, as previously described for the wrappie finishing module 42 (FIG. 8). The flat paper strip 58 (FIG. 9) penetrates into in a shaping sub-module 59 comprised of a shaping toothed wheel 60, and with which a counter-shaping toothed wheel 61 engages. The flat paper strip 58 is applied against the shaping toothed wheel 60 so as to be in direct contact with the paper surface, the coated surface being the outer surface. The shaping toothed wheel 60 fits within a cylindrical surface of revolution and has teeth, the crest 62 of which, having a width ranging from 10 mm to 15 mm between the edges of the teeth, fits within said cylindrical surface. The pitch developed between two successive tooth crests is 93 mm; the tooth base 63 of the shaping toothed wheel 60 comprises rows of suction openings (not shown) of the same type as those described for the preforming counter wheel for the pleated element. The rows are parallel to the direction of the teeth. In the event that maintaining the flat paper strip 58 via reduced pressure at the tooth base 63 proves insufficient, one can also envision having suctions at the tooth crests 62 of the shaping toothed wheel 60; this can weaken the teeth, however, as will be specified hereinafter. The counter shaping toothed wheel 61 is synchronized with the shaping toothed wheel 60 so that its teeth press the flat paper strip 58 onto the tooth base 63 of the shaping toothed wheel 60, where it is held by the suction openings. The shape of the teeth of the counter shaping toothed wheel 61 is determined simultaneously with that of the shaping toothed wheel 60 using diagrams, so that the length of flat paper between the planes of symmetry of two successive teeth is equal to the length of flat paper strip 58 needed for packaging the tacos, that is to say a length substantially equal to the diameter of the tortilla. The length of flat paper strip 58 required is on the order of 120 mm to 150 mm, that is to say 20% to 50% of the length of the pleated element of the pleated paper strip 31. The teeth are shallow and a shaping toothed wheel 60 can be designed, for example, with eight to ten teeth for a diameter of about 240 to 300 mm. The crest 62 of each tooth of the shaping toothed wheel 60 constitutes a welding counter electrode that tangents to the pleated paper strip 31 from beneath, so that the coated surface of the flat paper strip is in direct contact with the coated surface of the pleated element. The tangential speed of the shaping toothed wheel is equal to the scrolling speed of the pleated paper strip 31. A welding electrode 64, of a transverse welding device 130, identical to the welding electrode 50 (FIG. 8) previously described for the wrappie, has a tangential speed also equal to the scrolling speed of the pleated paper strip 58 (FIG. 9). The welding electrode 64 of the transverse welding device 130 is applied onto the pleated paper strip 31, at right angles with a pleatless zone, by pressing it against the coated surface of the flat paper strip 58, supported by the crest of the tooth forming the counter electrode, so as to form, downstream, loops 65 formed of a length of flat paper strip 58 corresponding to the length of flat paper strip of the "tacos" defined previously, closed by an element of the pleated paper strip 31. If the teeth of the shaping toothed wheel 60 comprise suction openings, there is a risk of degradation of said openings and of the counter electrode. Each loop 65 includes an upstream weld and a downstream weld. As soon as the upstream weld is made, the pleated paper strip 31 and the loops 65 scroll between the electrodes, and the retention by vacuum of the flat paper strip 58 on the shaping toothed wheel 60, is interrupted at each row of suction openings, the last row being neutralized at the time of making the upstream weld. Because the flat paper strip 58 is narrower than the pleated paper strip 31, the assembly is driven towards a cutting device 66 by belts 67 or motorized rollers which pinch the edges of the pleated paper strip 31 while allowing the loops 65 to remain free. The cutting device 66 is comprised of a rotatable cutting blade 71 located below the pleated paper strip 31 associated with loops 65 of flat paper, and of a fixed anvil 68 positioned above the pleated paper strip 31 and of the same type as the fixed anvil 39 (FIG. 2) described for the "wrapper", but inverted to allow passage of the loop 65 of the flat paper strip 58. The rotatable cutting blade 71 rotates at a tangential speed greater than the scrolling speed of the strip 31 at the time of cutting, in order to give the "tacos" a first impulse that tends to move it away from the next "tacos". The space at the rear of the rotatable cutting blade 71 is cleared to enable the loop 65 of flat paper strip to pass beyond the blade. Depending upon the length of flat paper strip 58 forming the loop 65 between two successive welds, the loop 65 tends to deform towards the rear and to get inserted undesirably between the rotatable cutting blade 71 and the fixed anvil 68, thereby causing the destruction of the "tacos". To avoid this disadvantage, it is associated, at the front of the rotatable cutting blade 71, with radial pallets 70 having a height, relative to the axis of rotation of the rotatable cutting blade 71, that is slightly less than that of the cutting blade, and taking support on the flat paper strip and pushing back the loop downstream right before the cutting. The cut is positioned right before the flat paper strip 58 is welded onto the pleated paper strip 31, so that the tacos thus formed does not risk getting caught in the wind, as described for the "wrappie". Upon exiting from the cutting device, the "tacos" is supported over a short distance by two lateral guides, and it is then held between two conveyor belts 72 which further increase its speed by flattening the loop 65, so that it is applied onto the pleated element, and then overlaps freely at the rear, at a sufficient distance from the next "tacos".

Figure 10:
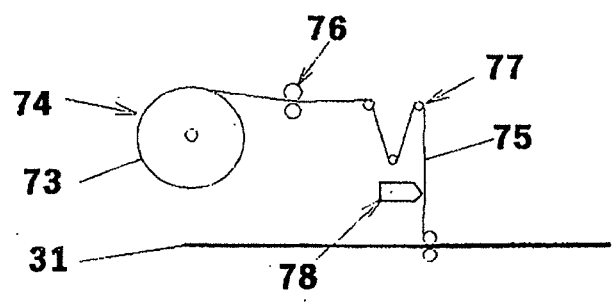
FIG. 10 shows a device for affixing a label that is adaptable to the modules for finishing the "wrapper", the "wrappie", the "tacos" and the packaging container for long sandwiches.
Figure 11:
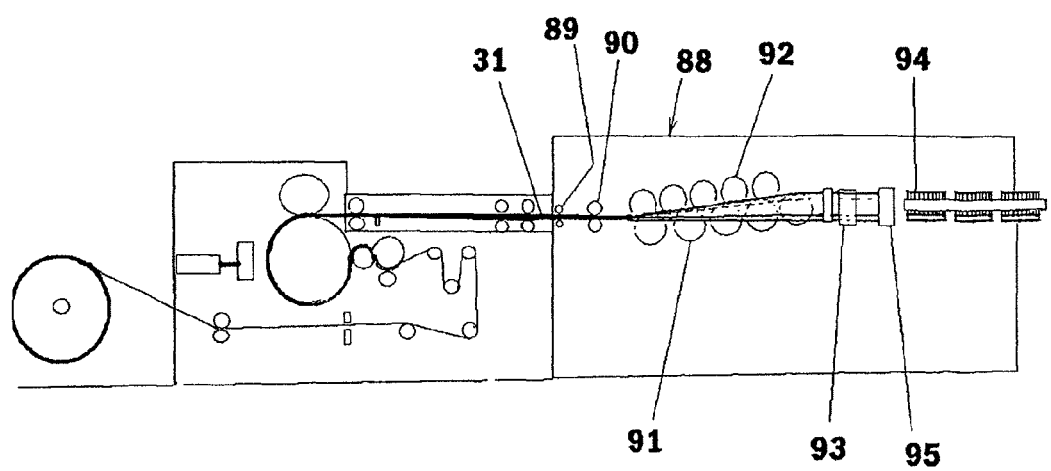
FIG. 11 is a schematic elevation view of the machine for making the "magic-bag", without the grouping device of FIGS. 3 and 4.
Figure 12:
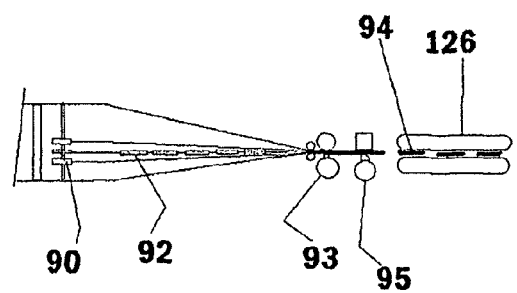
FIG. 12 is a schematic top view of the finishing module of the machine for making the "magic-bag".

Marking is necessary for certain products using a pleated element to make it possible, for example, to identify their contents. For example, there is a chain that makes made-to-order sandwiches, from a standard sandwich to or from which one or more components are added or removed. A series of icons have been established, which are devoid of any marking for a standard sandwich but are validated if the component is added and crossed out if the component is removed. This icon bar is currently printed on an edge of a simple, conventional rectangular flat paper, used for packaging, in which the sandwich is folded so that the icon bar is located on top of the sandwich and can be filled in at any time during manufacture or once packaging is in place on the sandwich. With respect to the wrapper, the tests for the icon bar on the median portion of the pleated element proved to be a failure, because the icons could be filled in only after the pleated element was deployed, but there was no support making it possible to fill in the icons without perforating the paper. With respect to the wrappie, the icons positioned in the median portion of the paper could be filled in before assembly of the sandwich, but the icon zone was not visible when the sandwich was waiting in a chute prior to being delivered to the customer. The object of the improvement has been to fix a rectangular label made of paper, preferably uncoated and having a weight of about 30 $g/m^2$, on the middle of the upper edge of the pleated element using a peelable dot of hot glue. The length of the label is that of the pleated element, and its width is preferably on the order of 50 mm. The dot of hot glue is for example a rounded shape about 5 mm in diameter and is located in the area of the fold for fixing the pleats of the pleated element. It can be filled in before or after assembly of the sandwich with a crayon as is done currently. When the wrapper or wrappie are deployed, the label remains flat on the top surface of the sandwich where it is clearly legible. The label can be peeled off the packaged sandwich at the time it is given to the customer. A sub-module 74 for affixing the label is comprised of a device 76 for unwinding a labeling paper strip 75 (FIG. 10) having a width of 50 mm and comprising a labeling paper reel 73 having a diameter on the same order as that of the flat paper reels, printed continuously, for example, with unmarked icon bars oriented in the scrolling direction of the paper of the reel of labels which follow one another and have a length such that there is at least one complete icon bar per label. The labeling paper reel 73 is positioned above the pleated paper strip 31, so that it can be pressed onto the latter on its paper surface with one of the edges aligned with the corresponding edge of the pleated paper strip 31. The labeling paper strip 75 unwound from the labeling reel passes through the unwinding device 76 and tension adjustment device 77 before passing into a device 78 for coating the paper with a dot of hot glue, whose positioning is synchronized with the positioning of the pleated elements forming the strip of pleated elements 31, right before entering, for example, into the pulling device 38 of the finishing module 118 (FIG. 7), or into the pulling device of the finishing modules 42 (FIG. 8), 53 (FIG. 9), 88 (FIG. 11), 128 (FIG. 12). The labeling strip 75 is then pressed between two rollers which can be the drive rollers 38 for the pleated paper strip 31, where it is affixed by the dot of glue, substantially in the middle of the successive pleated elements. In the case of the wrapper, the label is cut at the same time as the wrappers are separated. In the case of the wrappie, the width of the labeling reel 73 (FIG. 10), even if coated, can be reduced widthwise to escape the transverse welding of the flat paper strip 41 (FIG. 8), 58; otherwise, it is necessary to use an uncoated paper. It should be noted that it can be advantageous to print the labeling reels 73 (FIG. 10) at the same time as the flat paper reels 44 (FIG. 8) for the wrappie, and to cut the labeling reels 73 (FIG. 10) at the same time as the flat paper reels due to the fact that the consumptions of length for the flat paper strip 41 (FIG. 8) and for the labeling strip 75 (FIG. 10) are identical in principle with respect to the wrappie.

Figure 3:
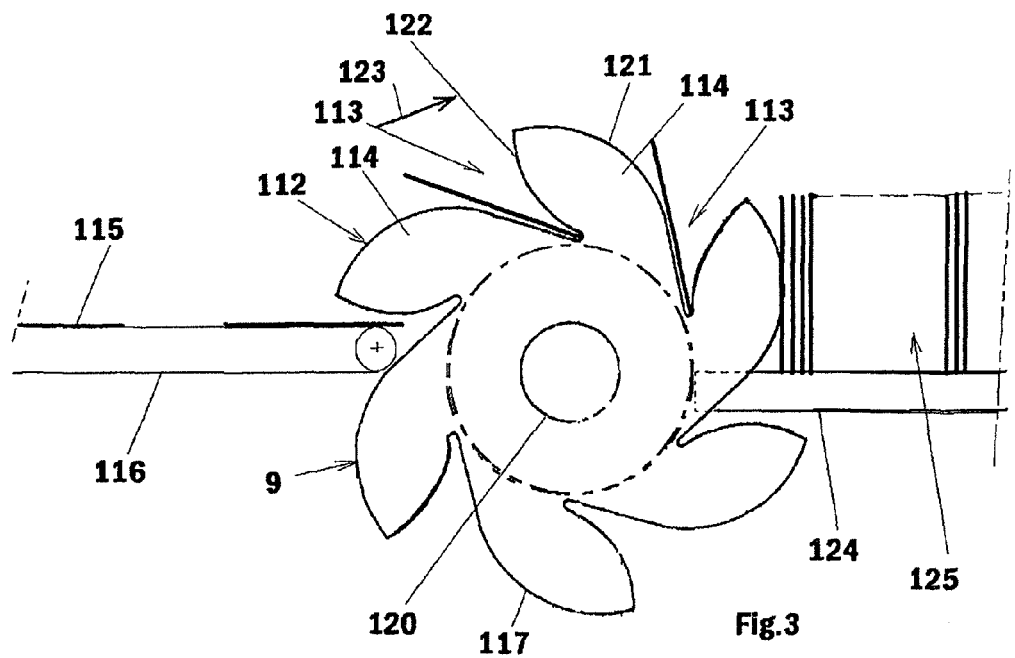
FIGS. 3 and 4 show elevation and top views of a device for grouping and processing the finished packaging containers.
Figure 4:
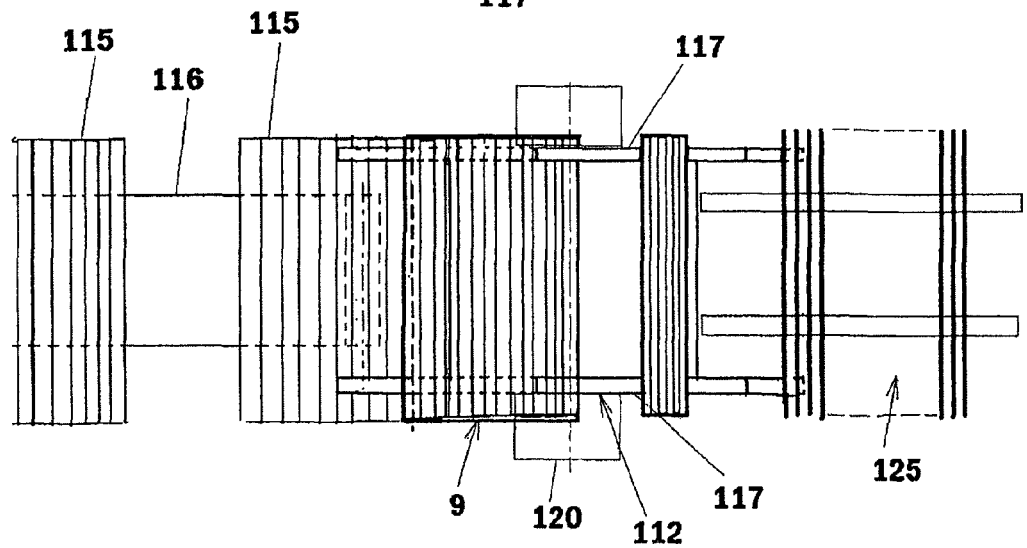

The packaging containers for loose products and long sandwiches generally use a width between 250 mm and 300 mm for the pleated element. The width "A" of the bars 79 (FIG. 5) is increased from 5 mm to 7.6 mm in order to preserve the wheel rigidity, the width "C" of the bar of the pleatless zone 80 being 18.6 mm. The manufacture of the magic-bags and self-closable bags uses a pleated element comprising fifteen pleats, preferably having a deployed pitch of (A+2B)=19.2 mm and a pleated pitch of A=7.6 mm; the length of the pleated element "Lp" 86 being 125 mm. This pleated member constitutes the pleated paper strip 31 (FIG. 2) produced by the pleating device 6 at the rate of one pleated element per revolution of the bar wheel. Two magic-bag sizes have been defined for packaging French fries, hereinafter called "fries", namely the "large" magic-bag 81 (FIG. 5) for an average capacity of 4.5 "oz", that is to say an average of 128 grams of fries, and the "medium" magic-bag 82 for an average capacity of 4 "oz", that is to say an average of 113 grams of fries. The magic-bag is obtained by folding the pleated element 83 over itself, perpendicular to the direction of the pleats. With respect to the "large" magic-bag, it is comprised of a front surface 84 having a height H1=106 mm and a width "Lp" 86 of 125 mm; a rear surface 85 having the same width and a height H2=125 mm, connected by a gusset 87 having a depth K=20 mm. The "medium" magic-bag has a front surface 84 having a height H1=91 mm and a width Lp of 125 mm; a rear surface 85 having the same width and a height H2=110 mm, connected by a gusset having a depth K=20 mm. The "large" magic-bag is made from a paper strip 14 (FIG. 2) having a width of 286 mm, whereas the medium magic-bag uses a paper strip 14 having a width of 256 mm. The 19 mm offset between the front and the rear surfaces of the magic-bags makes it easier to insert the fries scoop between the walls of the bag. The finishing module 88 (FIG. 11) for the magic-bag, at the inlet, comprises a device 89 for pulling the pleated paper strip 31 similar to that 38 (FIG. 7) described for the wrapper. The pleated paper strip 31 then passes through three creasing devices 90 (FIGS. 11 and 12), two of which are positioned beneath the pleated paper strip 31 corresponding to the pleats connecting the front surface 84 (FIG. 5) and rear surface 85, respectively, to the gusset 87, whereas the third creasing device, positioned on the pleated paper strip, corresponds to the pleat of the bottom of the gusset 87. The pleated paper strip 31 (FIGS. 10 and 11) is then shaped to form an "M" using three series of aligned and motorized disks corresponding to the creases made, two series of disks 91 being positioned beneath the pleated paper strip 31 and the third series of disks 92 on the pleated paper strip 31. The three series of disks 91 and 92 are linear and oriented so as to gradually close the "M" in order for the front 84 and rear 85 surfaces (FIG. 5) to come into contact with one another and for the gusset 87 to close in on itself. Each pleatless zone 80 is folded over itself, with the coated surfaces being in contact. The pleated paper strip 31 (FIGS. 11 and 12) then enters into a welding device 93, similar to the welding device 45 (FIG. 8), already described for the manufacture of the "wrappie" but with vertically positioned electrodes, and then into a cutting device 95, similar to the cutting device 37 (FIG. 7) for the "wrapper" but vertically positioned. The width of the weld is on the order of 10 mm, and the cut is made substantially in the middle of the weld; the "magic-bag" is then completed with lateral welds about 5 mm wide. The "magic-bags" 94 are caught between two output conveyor belts 126 in order to be moved toward the stacking and processing module 9 (FIG. 3 and FIG. 4).

Figure 13:
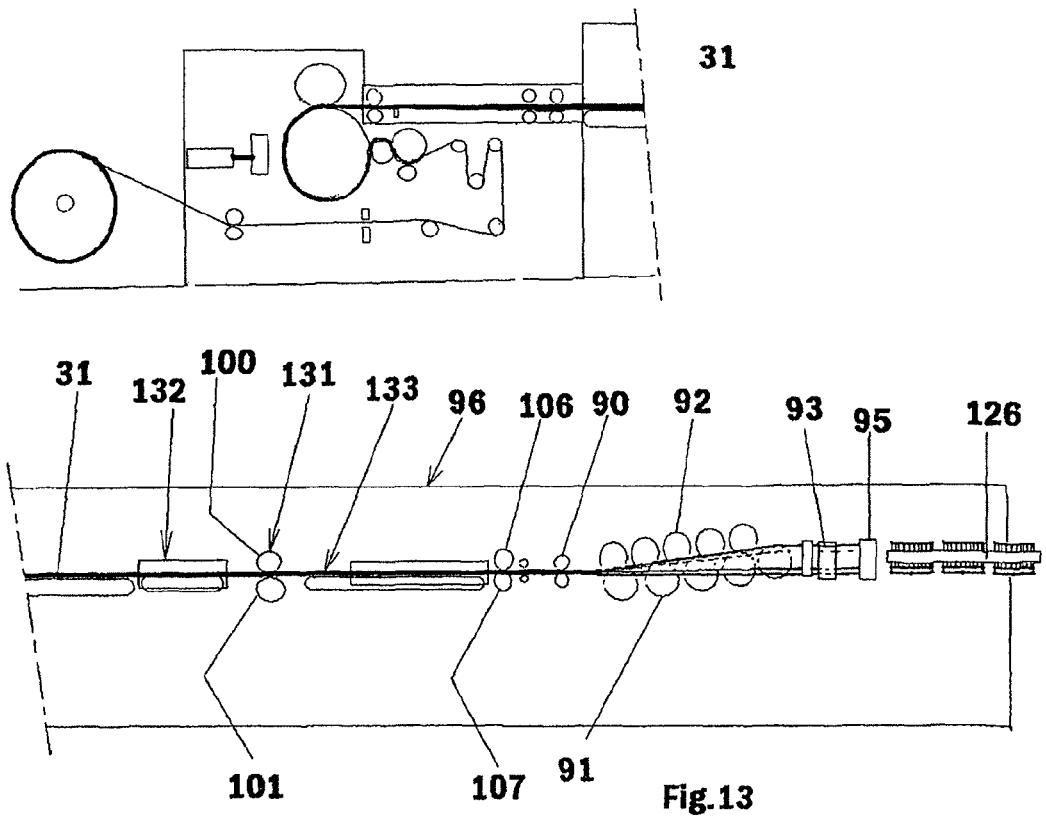
FIG. 13 is a schematic elevation view of the machine for making the self-closable bag, without the grouping device of FIGS. 3 and 4.
Figure 14:
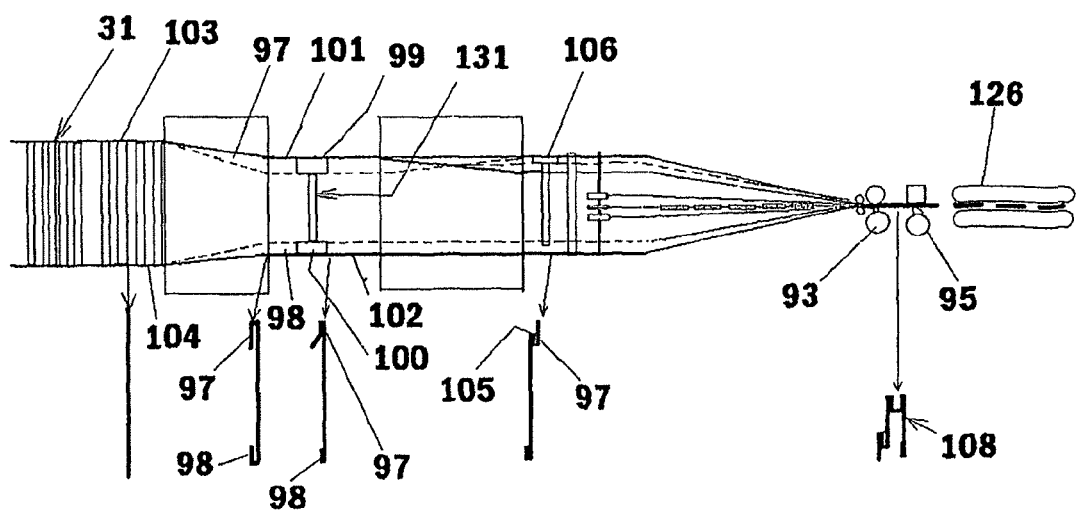
FIG. 14 is a schematic top view of the finishing module of the machine for making the self-closable bag.

The manufacture of the self-closable bag uses a wide pleated element preferably comprising fifteen pleats of varying depth depending upon the height, and therefore the capacity, of the self-closable bag. It is possible, for example, to make a self-closable bag for four to six breaded chicken pieces from a pleated element sized to obtain a "large" bag for fries; the pleated paper strip 31 (FIG. 13 and FIG. 14) penetrates into the finishing module 96, in which the bottom of the bag is creased with a gusset, as previously described for the manufacture of the "magic-bag", or without a gusset, given that the self-closable bag does not necessarily need to stand upright. The creases for folding the bottom of the self-closable bag are positioned so that the edges of the finished bag are opposite one another, in contrast to the magic-bag; it then enters into a first longitudinal folding device 132. A first lateral edge 103 of the pleated paper strip 31 is folded over itself from beneath, for example over 30 mm, to form a first flap 97, whereas the second lateral edge 104 is folded from beneath, for example over 15 mm, to form a second flap 98 half as wide as the first flap 97, after being creased from beneath (not shown), so that the coated surfaces of the first and second flaps 97 and 98 are opposite one another, by means of a shaping device similar to the shaping and knurling device 36 of the module 7 (FIG. 7) used for fixing the pleats. The width of the pleated paper width 31 is therefore reduced by the value of the width of the flaps, and the pleated paper strip has a first 101 and a second 102 intermediate edges (FIGS. 13 and 14); the flaps of the first and second intermediate edges 101 and 102 then pass through a longitudinal welding device 131, between welding rollers 99 and 100, which each weld over a width of 15 mm from each intermediate edge 101 and 102 of the pleated paper strip 31. The first flap 97 is welded over half of its width, whereas the second flap 98 is welded over its entire width. Finally, the pleated paper strip passes through a longitudinal second folding device 133, in which the first flap 97 is reversed so that the pleat 105 formed and suitably cold marked by rollers 106 and 107 to stay in place is flush with the welded zone, that is to say at 15 mm from the intermediate edge 101 of the pleated paper element 31. Finally, the bag is shaped, welded and cut as previously described for the magic-bag with respect to the finishing module 88 (FIGS. 11 and 12) for obtaining the self-closable bag shown along a cross-section 108.

Figure 15:
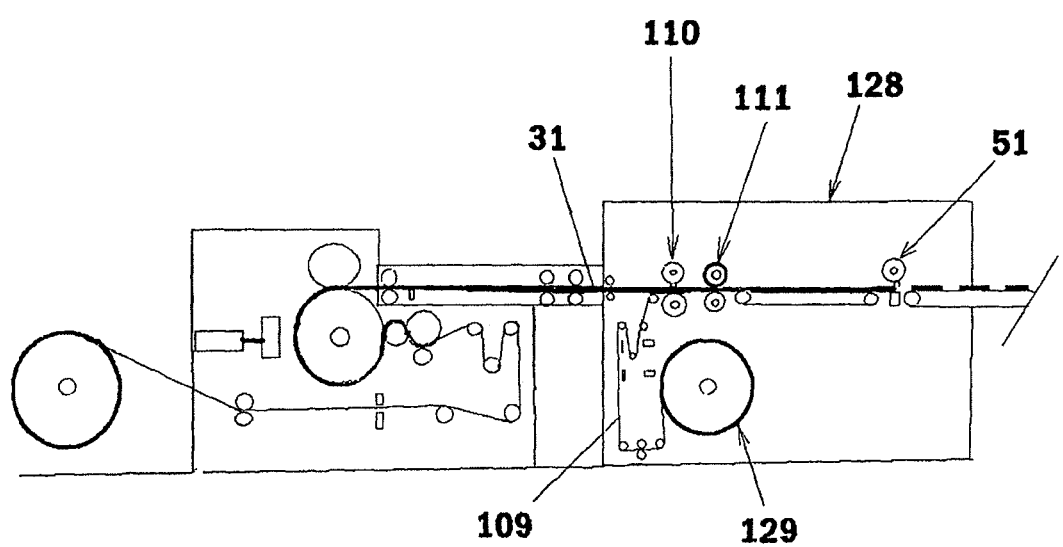
FIG. 15 is a schematic top view of the finishing module of the machine for making the packaging container for a long sandwich.

The self-closable pleated packaging, intended for long sandwiches is comprised of a pleated element having eight pleats using a bar wheel having two sets of seven bars 7.6 mm wide, and a bar 18 mm wide, pleating two pleated elements per bar wheel revolution, using a coated paper strip having a variable width as a function of the length "L" of the sandwich and of its diameter "Dd", that is to say equal to Dd+L+30 mm. The pitch generally used is the same as that of the "magic-bag", that is to say 19.2 mm, which yields a pleating ratio between 2 and 3. The pleated element has a length of 79 mm; the pleated paper strip 31 (FIG. 15) which penetrates into the finishing element 128 for the self-closable pleated packaging is lined with a coated flat paper strip 109 which is welded on three sides along the two lengths perpendicular to the pleats corresponding to the zone for fixing the pleats made in the module 7 (FIG. 7), and a width parallel to the pleats allowing the second width, parallel to the pleats, to remain free and constituting the opening of the self-closable pleated packaging. A sub-module 129 for unwinding the flat paper strip 109 (FIG. 15) has a width equal to the width of the pleated paper strip 31 reduced by 15 mm; and the positioning of this flat paper occurs substantially as in the finishing module 42 (FIG. 8) described for the "wrappie", with the following modifications of the finishing module 42: the flat paper strip 109 (FIG. 15) is positioned as indicated for the wrappie beneath the pleated paper strip in order to be welded transversely by a transverse welding device 110 identical in its principle to the transverse welding device 45 (FIG. 8), and then welded by a knurling wheels device 111 (FIG. 15) over a width of 5 mm and at a distance of 7.5 mm from the edges of the pleated paper strip 31, so that the coated surfaces of the pleated paper element 31 and the flat paper strip 109 are properly in contact by avoiding the edge corresponding to the welding zone for fixing the pleats of the pleated paper strip 31. The remainder of the process is the same as that described for the "wrappie".

The grouping of the various packaging containers, the manufacture of which is described hereinabove, is achieved by a grouping and processing module 9 (FIG. 3 and FIG. 4) preferably using the principle of a star 112 comprising notches 113 demarcating at least six teeth 114, each of which houses a completed packaging 115 brought along by the output conveyor belt 116 of the finishing module 8 (FIG. 2). It is formed of two flanges 117, connected to one another by a motor-driven shaft 120, and between which the output conveyor belt 116 brings the completed packaging 115 for grouping, and with the linear speed of which the motor-driven shaft 120 is synchronized. With respect to the "wrapper", the "wrappie", the "tacos" and the self-closable pleated packaging, hereinafter referred to as the "sandwich packaging" 115, the motorized shaft 120 of the star is horizontal; the width of the output conveyor belt 116 is less than that of the constituent pleated element of the completed packaging 1115 considered. The depth of the notches 113 is at least equal to the length of the pleated element for the wrapper, the wrappie, and the self-closable pleated packaging, whereas for the tacos, the depth is at least equal to the length of the flat paper. For each flange 117, the notch has a front surface 121 and a rear surface 122, taken in the direction of rotation 123 of the star 112. The completed packaging 115 penetrates into the star 112 which rotates continuously at a speed synchronized with the cutting device of the finishing module 8 (FIG. 2), along a substantially horizontal path between the two front 121 and rear 122 surfaces, the front surface 121 serving as a ramp to bring the sandwich packaging to the bottom of the notch 113, at the base of the rear surface 122, which takes support on the pleated element of the completed packaging 115 in order to bring it rotationally about the motorized shaft 120 of the star 112, until reaching a device 124 for blocking the rotation of the sandwich packaging container 115. The front surface 121 is shaped to form a ramp which, when the completed packaging 115 is rotationally blocked, moves the latter translationally into a preferably substantially horizontal stacking chute 125, in which the sandwich packaging container takes support on the previous sandwich packaging containers positioned perpendicular to the direction of the stacking chute 125, forming a horizontal stack having a generally parallelepipedic shape that is maintained by a shaping device. A count is carried out at the time of stacking, and it is possible to position a device (not shown in FIGS. 3 and 4) for signaling the end of the counting cycle, such as a lever, for example, which slightly modifies the position of the sandwich packaging container in the stack so as to serve as a reference for defining the quantity of sandwich packaging placed in each grouping box. The grouping boxes are preferably parallelepipedic, and the openings have the surface of the sandwich packaging taken perpendicular to its main plane, which makes it possible to insert directly a stack of sandwich packaging containers, the length of which is defined by the counting reference markings.

The "magic-bag" and the self-closable bag exit from the finishing element 88 (FIG. 11), in vertical position, and are brought between the flanges of the star, whose axis is vertical, pinched between two output conveyor belts 126 (FIGS. 11 to 14); they are inserted between the flanges 117 (FIGS. 3 and 4) as previously but are kept in height between the flanges 117 by a sliding plate (not shown) which extends throughout the rotation about the motorized shaft 120 positioned vertically up to the stacking chute 125 which operates as previously described for other packaging containers.

The invention claimed is:

1. Assembly for producing fast food packaging for sandwiches or loose products, using a pleated element made from a paper strip having a width and coated on one side with polypropylene and/or polyethylene, comprised of deep coated pleats parallel to one another and fixed at their ends, this production assembly being comprised of a paper feed module feeding a pleating module, said pleating module being provided with a pleat forming mechanism and a pleat coating mechanism pleating the paper strip coming from a reel of the paper feed module to obtain a free pleated paper strip, the pleating module being followed by a unit for fixing the end of the pleats producing a pleated paper strip, which then penetrates into a finishing unit wherein:

the pleating module comprises a preforming wheel and a preforming counter-wheel forming the pleat-forming mechanism, a bar wheel, a pleat grouping wheel and a pleat coating wheel forming the pleat coating mechanism,
  the unit for fixing the end of the pleats and the finishing unit are in the form of separate modules, the finishing module being specific to each type of packaging manufactured, thereby producing a completed packaging container,
  the production assembly includes a collecting and processing module collecting the completed packaging of the finishing module, and
  the completed packaging containers exiting from the finishing module are brought into a grouping and processing module by an output conveyor belt, comprised of a star rotating about a horizontal motorized shaft, which brings the completed packaging containers into a stacking chute.

2. Production assembly according to claim 1, wherein the paper feed module is comprised of at least one winder comprising a mandrel slowed rotationally and comprising a locking brake and a sensor for signaling the end of reel.

3. Production assembly according to claim 1, wherein the pleating module comprises a pulling device, at the inlet of the paper strip, followed by a centering device, which is in turn followed by a tension control device capable of acting on the pulling device, the paper strip then entering into the wheels of the pleating device with the coated surface applied onto the preforming wheel.

4. Production assembly according to claim 3, wherein the preforming wheel is interchangeable.

5. Production assembly according to claim 1, wherein the bar wheel of the pleating module comprises at least one wider bar that makes it possible to create a pleatless zone.

6. Production assembly according to claim 1, wherein a pleat prefixing device is arranged in the vicinity of the edges of the paper strip, comprising two hot air nozzles which heat loops made from the paper strip when it passes on the pleat grouping wheel, to form the free pleated paper strip, these hot air nozzles being temperature-regulated as a function of the speed of the machine and mounted on jacks which retract instantly when said modular machine stops.

7. Production assembly according to claim 1, wherein, for a sandwich having a round, square or an intermediate shape, the width of the reel is determined by the sum of the equivalent diameter and of the height of the sandwich.

8. Production assembly according to claim 1, wherein the finishing module comprises a separation device comprised of a rotatable cutting blade and a fixed anvil.

9. Production assembly according to claim 1, wherein the finishing module comprises a transverse welding device comprising a rotatable electrode pinching the pleated paper strip on a flat paper strip against a rotatable counter-electrode.

10. Production assembly according to claim 1, wherein the finishing module comprises a sub-module for unwinding the flat paper strip.

11. Production assembly according to claim 1, wherein the finishing module comprises a shaping sub-module comprising a shaping toothed wheel having tooth crests and tooth bases, and a counter-shaping wheel, the tooth crests of the shaping toothed wheel serving as a rotatable counter-electrode for the transverse welding device.

12. Production assembly according to claim 11, wherein the flat paper strip is maintained on the tooth base by suction openings.

13. Production assembly according to claim 1 wherein the finishing module comprises creasing devices.

14. Production assembly according to claim 1, wherein the finishing module comprises longitudinal welding devices.

15. Production assembly according to claim 1, wherein the finishing module comprises a first longitudinal folding device forming a first flap and a second flap, which passes through the longitudinal welding device which welds the first flap over half of its width and the second flap over its entire width, and enters into a second longitudinal folding device in which the first flap is reversed to form a pleat that is flush with the welded zone of the first flap of the pleated paper element.

16. Production assembly according to claim 1, wherein the finishing module can be equipped with a label affixing sub-module, positioned above the pleated paper strip, comprised of a device for unwinding a labeling paper strip which then passes through a device for coating the labeling paper strip with a dot of hot glue, and which is then applied and pressed between two rollers on the paper side of the pleated paper strip where it is fixed, and which is cut upon exit from the finishing module at the same time as the finished products by the separation device.

17. Assembly for producing fast food packaging for sandwiches or loose products, using a pleated element made from a paper strip having a width and coated on one side with polypropylene and/or polyethylene, comprised of deep coated pleats parallel to one another and fixed at their ends, this production assembly being comprised of a paper feed module feeding a pleating module, said pleating module being provided with a pleat forming mechanism and a pleat coating mechanism pleating the paper strip coming from a reel of the paper feed module to obtain a free pleated paper strip, module being followed by a unit for fixing the end of the pleats producing a pleated paper strip, which then penetrates into a finishing unit wherein:

the pleating module comprises a preforming wheel and a preforming counter-wheel forming the pleat-forming mechanism, a bar wheel, a pleat grouping wheel and a pleat coating wheel forming the pleat coating mechanism, the unit for fixing the end of the pleats and the finishing unit are in the form of separate modules, the finishing module being specific to each type of packaging manufactured, thereby producing a completed packaging container, the production assembly includes a collecting and processing module collecting the completed packaging of the finishing module, and wherein the finishing module comprises three series of aligned and motorized disks, two series of disks of which are positioned beneath the pleated paper strip, the third series of disks being positioned above the pleated paper strip, which are oriented to form an "M" with the pleated paper strip which closes gradually, causing each pleatless zone to face itself.

18. Assembly for producing fast food packaging for sandwiches or loose products, using a pleated element made from a paper strip having a width and coated on one side with polypropylene and/or polyethylene, comprised of deep coated pleats parallel to one another and fixed at their ends, this production assembly being comprised of a paper feed module feeding a pleating module, said pleating module being provided with a pleat forming mechanism and a pleat coating mechanism pleating the paper strip coming from a reel of the paper feed module to obtain a free pleated paper strip, the pleating module being followed by a unit for fixing the end of the pleats producing a pleated paper strip, which then penetrates into a finishing unit wherein:

the pleating module comprises a preforming wheel and a preforming counter-wheel forming the pleat-forming mechanism, a bar wheel, a pleat grouping wheel and a pleat coating wheel forming the pleat coating mechanism, the unit for fixing the end of the pleats and the finishing unit are in the form of separate modules, the finishing module being specific to each type of packaging manufactured, thereby producing a completed packaging container, the production assembly includes a collecting and processing module collecting the completed packaging of the finishing module, and wherein the pleat fixing module is mainly comprised of a chassis comprising two conveyor belts which pinch the free pleated paper strip above and below, the width of said conveyor belts leaving free the end of the pleats of the free pleated paper strip, which makes it possible to mark a fold line on each side of the free pleated paper strip using a creasing device comprised of at least two rollers with narrow edges pinching the free pleated paper strip against the same number of wide rollers, these latter being motorized at a speed synchronized with that of the free pleated paper strip, which then passes through a zone equipped with hot air nozzles, the edges of which enter into a shaping device which folds them by placing the coated side of the free pleated paper strip in contact with itself, the folded edges then passing between wide knurling rollers, which are motorized and synchronized with the displacement speed of the paper strip, to form the pleated paper strip.

19. Production assembly according to claim 18, wherein the pleat fixing modules are interchangeable as a function of the width of the paper strip used.

20. Production assembly according to claim 18, wherein between two consecutive transverse welds with the pleated paper strip, the flat paper strip forms loops.

21. Production assembly according to claim 17, wherein the completed packaging containers exiting from the finishing module are brought into a grouping and processing module by an output conveyor belt, comprised of a star rotating about a horizontal motorized shaft, which brings the completed packaging containers into a stacking chute.

22. Production assembly according to claim 1, wherein the completed packaging containers exiting from the finishing module in vertical orientation are brought into the grouping and processing module, pinched between two output conveyor belts in the star rotating about the motorized shaft in a vertical position, and are maintained in height by a sliding plate that extends throughout the rotation about the motorized shaft up to the stacking chute.

* * * * *